(12) United States Patent
Hibino

(10) Patent No.: US 6,539,192 B2
(45) Date of Patent: Mar. 25, 2003

(54) DEVELOPING DEVICE WITH DEVELOPING MARK REDUCTION FEATURE AND CARTRIDGE USING SAME

(75) Inventor: Masaru Hibino, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/915,323

(22) Filed: Jul. 27, 2001

(65) Prior Publication Data

US 2002/0044796 A1 Apr. 18, 2002

(30) Foreign Application Priority Data

Jul. 31, 2000 (JP) .......................................... 2000-231750

(51) Int. Cl.$^7$ .............................................. G03G 15/00
(52) U.S. Cl. ........................................ 399/267; 399/277
(58) Field of Search ................................. 399/267, 270, 399/276, 277

(56) References Cited

U.S. PATENT DOCUMENTS

| | | |
|---|---|---|
| 5,438,394 A | 8/1995 | Suzuki et al. |
| 5,576,812 A | 11/1996 | Hibino et al. |
| 6,049,687 A | 4/2000 | Hibino et al. ............ 399/270 |
| 6,219,514 B1 * | 4/2001 | Kobayashi et al. ......... 399/277 |

* cited by examiner

Primary Examiner—Hoang Ngo
(74) Attorney, Agent, or Firm—Fitzpatrick, Cella, Harper & Scinto

(57) ABSTRACT

A developing device includes a developing container containing a developer having non-magnetic toner and magnetic carriers. A developer carrying member bears and carries the developer contained in the developing container. A magnetic field generating device generates a magnetic field provided in the developer carrying member, wherein an electrostatic latent image formed on an image bearing member is developed with a magnetic brush, which is formed on the developer carrying member by the magnetic field generating device. The image bearing member and the developer carrying member move in opposite directions at a closest portion therebetween. A peak position of a magnetic force Fr generated by the magnetic field generating device in a direction vertical to a surface of the developer carrying member is disposed in the vicinity of the closest portion and downstream in a rotation direction of the developer carrying member from the closest portion.

23 Claims, 5 Drawing Sheets

DEVELOPING DEVICE WITH DEVELOPING MARK REDUCTION FEATURE AND CARTRIDGE USING SAME

BACKGROUND OF THE INVENTION

1. Field of the Invention

The present invention relates to a developing device for developing an electrostatic latent image formed on an image bearing member or a cartridge having the developing device, detachably mountable to an image forming apparatus. In particular, the present invention relates to a developing device or a cartridge used in an image forming apparatus such as a copier, a printer, and a facsimile.

2. Description of the Related Art

Conventionally, as a developing device used in an image forming apparatus using an electrophotographic process, various devices have been proposed and put into practical use. Such devices are roughly classified into a developing device of a mono-component development system and a developing device of a dual-component development system. The mono-component development system mostly adopts a non-contact system, and as a representative development method, there is a mono-component jumping development method using magnetic toner.

According to this development method, a high quality image can be obtained with a simple configuration. However, toner contains a magnetic substance, so that a color image cannot be obtained. According to the mono-component development method using non-magnetic toner, a color image can be obtained. However, it is difficult to coat a developing sleeve with toner. Therefore, the developing sleeve is coated with toner with an elastic blade, which is disadvantageous in terms of stability and durability.

According to the dual-component development method, toner is fed to a development region by magnetic carriers for development. A development process is usually conducted by bringing a developer into contact with a photosensitive drum. Hereinafter, the development process will be described with reference to FIG. 6.

In FIG. 6, reference numeral 30 denotes a developing sleeve, 35 denotes a magnet roller fixed in the developing sleeve, 31 and 32 denote agitating screws, 33 denotes a regulating blade disposed so as to form a developer into a thin layer on the surface of the developing sleeve, and 34 denotes a developing container. Now, a development process of visualizing an electrostatic latent image with a developing device by a dual-component magnetic brush method, and a circulation system of a developer will be described. A developer taken up at an N3-pole along with the rotation of the developing sleeve 30 is regulated by the regulating blade 33 while being fed from an S2-pole to an N1-pole, and formed into a thin layer on the developing sleeve 30.

When the developer formed into a thin layer is fed to an S1-pole that is a development main pole, a magnetic brush is formed due to a magnetic force. An electrostatic latent image is developed with the developer which stands like ears of rice. Thereafter, the developer on the developing sleeve 30 is returned to the developing container 34 by a repulsive magnetic field of an N2-pole and an N3-pole. The dual-component development is generally conducted in such a manner that, as described above, magnetic poles with the same polarity are arranged, and a developer after development is peeled from a developing sleeve so as not to allow an image history to remain.

The developing sleeve is supplied with a D.C. bias and an A.C. bias from a power supply (not shown). In general, according to the dual-component development method, application of an A.C. bias enhances a development efficiency, resulting in a high quality image.

As a method for forming an electrostatic latent image, there is a known method for scanning an electrophotographic photosensitive member with a laser beam modulated in accordance with an image signal to be recorded, thereby exposing the member to light, and forming an electrostatic latent image in which a latent image having a dot distribution shape (i.e., a dot-shaped latent image) is distributed in accordance with an image. In particular, according to a so-called pulse width modulation (PWM) method for modulating a width (i.e., a duration time) of a driving pulse current of a laser in accordance with a tone of an image to be recorded, a high recording density (i.e., a high resolution) and high gradations can be obtained.

In recent years, higher quality and longer life using a dual-component developing device have been developed. In order to achieve a long life, it is required to prevent a developer from being compressed, so as to avoid degradation of toner and carriers. As one method, decreasing magnetization of magnetic carriers in a developer is considered. Decreasing magnetization of carriers weakens a force of rubbing a toner image developed onto a photoconductor in a developing section, and thus results in high quality image.

In the case where the magnetization of carriers is decreased, and the developing sleeve and the photosensitive drum rotate in a forward direction, there is also a disadvantage while the above-mentioned advantage is obtained. More specifically, in a developing section, a magnetic brush becomes short, and a nip (peripheral direction) at which a developer is in contact with the photosensitive drum becomes narrow. As a result, the density of a trailing end of a black copy is increased; that is, edge enhancement such as so-called sweeping-together becomes conspicuous.

This phenomenon occurs as follows. In the case where the developing sleeve and the photosensitive drum rotate in a forward direction at an opposing portion, during development of a black copy, toner accumulates on the photosensitive drum side, upstream of the above-mentioned nip at which a developer is in contact with the photosensitive drum, and toner hardly adheres to the photosensitive drum in a solid black area due to development defects. Consequently, accumulated toner adheres to the trailing end (of the black copy) at once.

When a magnetic brush is long, the nip at which the magnetic brush is in contact with the photosensitive drum becomes longer. Therefore, toner does not accumulate, and sweeping-together at the trailing end of a black copy does not occur. Furthermore, in counter development in which the developing sleeve and the photosensitive drum rotate in opposite directions at an opposing portion, toner does not accumulate on the photosensitive drum side, upstream of the above-mentioned nip. Therefore, even when the magnetization of carriers is decreased, and a magnetic brush is shortened, edge enhancement such as sweeping-together is unlikely to occur.

Accumulation phenomenon in the case where the developing sleeve and the photosensitive drum rotate in a forward direction occurs on the photosensitive drum. More specifically, this phenomenon occurs upstream in a rotation direction of the photosensitive drum (upstream in a rotation direction of the developing sleeve) from the nip at which a magnetic brush is in contact with the photosensitive drum.

However, in counter development, the developing sleeve and the photosensitive drum move in opposite directions. Therefore, toner actually does not accumulate and is fed outside of the nip by the rotation of the photosensitive drum, whereby the accumulation of toner that causes sweeping-together and the like does not occur.

In producing and assembling a developing device, conductive magnetic powder may enter a developing container. For example, in the case where a developing container with a developing sleeve attached thereto is closed with a cover to complete a developing device, when the cover is fixed onto the developing container with a screw, chip powder of the screw (i.e., conductive magnetic powder) formed between the screw and a bit insert may enter the developing container. Conductive magnetic power may adhere to the clothing of an operator who assembles the developing container or an operation tool (e.g., a screwdriver, etc.), and this powder may enter the developing container during assembling. Thus, in a production and assembly process of the developing device (developing container), and in an exchange process of the developing device (developing container), conductive magnetic powder may enter the developing device.

In the case where a primary charger adopting a corona charging system is used for charging a photoconductor so as to form an electrostatic latent image, conductive magnetic powder may also enter the developing container. More specifically, in order to refresh a discharge wire of the primary charger (i.e., to enhance a discharge efficiency by removing a substance generated by discharge, which may adhere to the discharge wire due to repeated use), the discharge wire is ground manually by a user or a serviceman or automatically to generate conductive magnetic power. This conductive magnetic power may enter the developing container for some reason.

However, in the case where development is conducted in the above-mentioned constitution in which the magnetization of carriers is decreased, and the developing sleeve and the photosensitive drum are allowed to rotate in opposite directions at an opposing portion, when conductive magnetic powder enters the developing container, discharge marks are generated continuously in a line shape. The maximum length of the discharge mark thus generated in a line shape sometimes reach 700 mm.

In the discharge phenomenon, discharge marks are hardly generated continuously, but formed individually. Individual discharge marks are formed in such a manner that a white hollow portion is formed at the center and the periphery thereof is thick in a ring shape, or the discharge marks become thick entirely. The discharge marks are generated in both a blank copy area and a black copy area. When the discharge marks are generated continuously in a line shape, they become conspicuous, which substantially degrades image quality.

SUMMARY OF THE INVENTION

Therefore, with the foregoing in mind, it is an object of the present invention to provide a developing device in which an occurrence ratio of discharge marks can be decreased even when conductive magnetic powder enters a developing container.

Another object of the present invention is to provide a developing device in which the maximum length of discharge marks can be reduced even when they are generated in a line shape.

Still another object of the present invention is to provide a cartridge in which an occurrence ratio of discharge marks can be decreased even when conductive magnetic powder enters a developing container.

Still another object of the present invention is to provide a cartridge in which the maximum length of discharge marks can be reduced even when they are generated in a line shape.

These and other advantages of the present invention will become apparent to those skilled in the art upon reading and understanding the following detailed description with reference to the accompanying figures.

DESCRIPTION OF THE PREFERRED EMBODIMENTS

Figure 1:
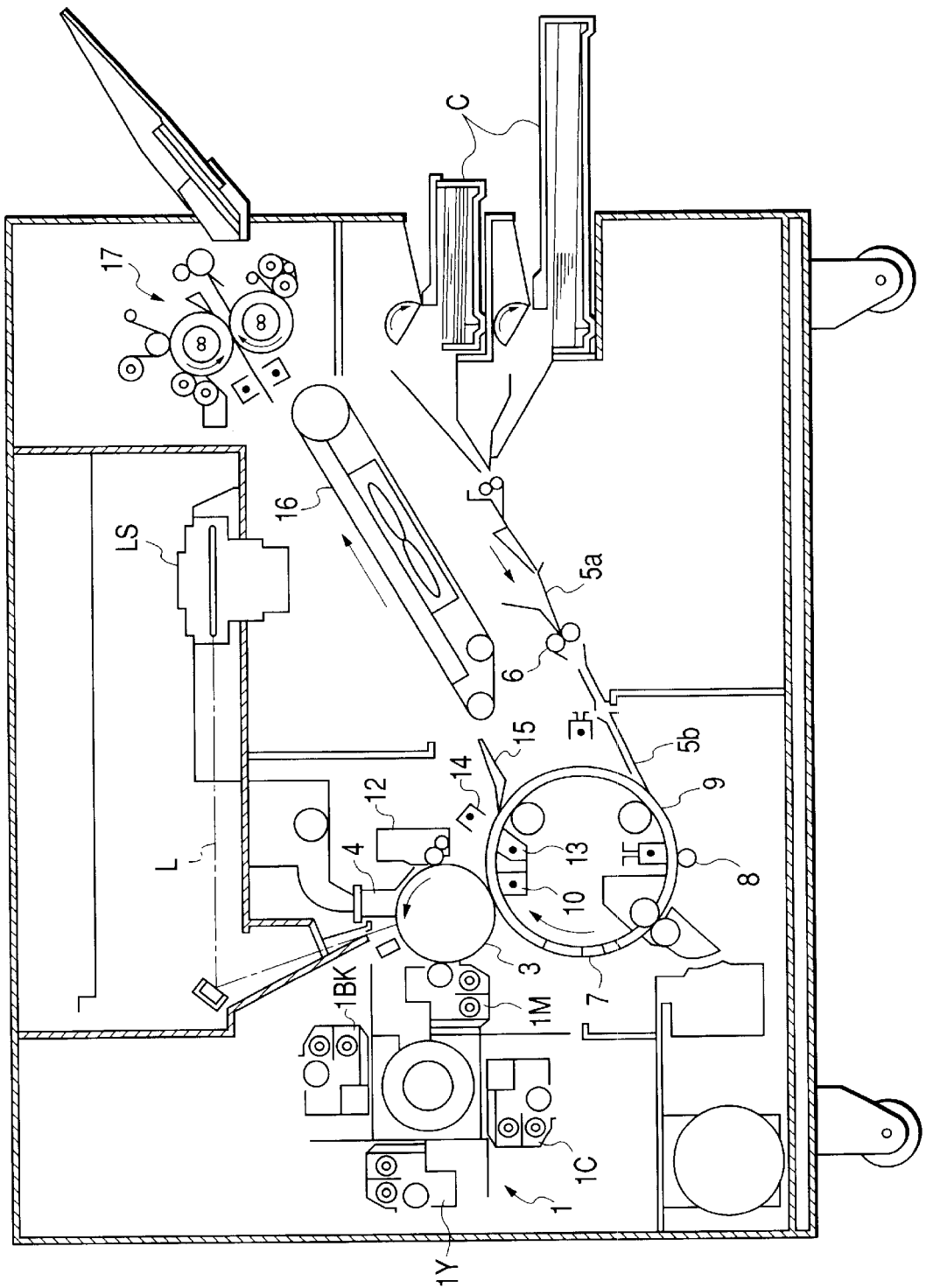
FIG. 1 is a vertical cross-sectional view showing an example of a full-color image forming apparatus according to the present invention.

In the following example, in development of an electrostatic latent image, a peak position of a magnetic force (magnetic attractive force) that is allowed to act on a developer by a magnetic field generating device is regulated. Thus, even when conductive magnetic powder enters a developing container, an occurrence ratio of discharge marks is decreased, and the maximum length of the discharge marks is reduced even in the case where they are generated in a line shape.

There is no particular limit to an image forming method, as long as a process of supplying a developer as described later is conducted, and an electrostatic latent image formed on an image bearing member is developed with a dual-component developer to be recorded onto a sheet of paper or the like. For example, as an image forming method, an electrophotographic process, an electrostatic recording process, or the like, which are conventionally known, can be used.

An image forming apparatus can have various configurations which are conventionally known, as long as it has a feature such as an intensity of a magnetic field generated by a magnetic field generating device (described later).

An image forming apparatus with such a configuration includes a photoconductor (e.g., an organic photoconductor) as an image bearing member, a charging device (corona charger) for charging the image bearing member, a light-exposure device for forming an electrostatic latent image corresponding to an image (e.g., an image of a copy original) to be formed on the charged image bearing member, a developing device for developing an electrostatic latent image formed on the image bearing member at the closest portion (developing portion) between the image bearing member and the developer carrying member by bringing a magnetic brush (Carriers that stand like the ears of rice by a magnetic field is formed in a brush shape on the developer carrying member. The carriers carry toner, and the toner adheres to the electrostatic latent image on the image bearing member, whereby development is conducted.) formed on the developer carrying member by a magnetic field generating device into contact with the image bearing member, a transfer device for transferring a toner image obtained by development onto a transfer material such as plain paper and the like, a fixing device for fixing a transferred unfixed toner image by heating under pressure, a cleaning device for removing toner remaining on the image bearing member after transfer, and the like.

The developing device at least includes a rotatable non-magnetic cylinder (developing sleeve) as a developer carrying member, a magnet roller as a magnetic field generating device fixed in the non-magnetic cylinder, and a developing container for containing a dual-component developer. According to the present invention, during development, the non-magnetic cylinder and the image bearing member for bearing an electrostatic latent image move in opposite directions, i.e., opposing directions (counter directions) at the closest portion (developing portion) therebetween.

The non-magnetic cylinder is preferably made of a conductive material. Examples of the material include conventionally known various materials, such as metal (e.g., stainless steel, aluminum, etc.) and a resinous body provided with conductivity by dispersion of conductive particles. Furthermore, in order to enhance a feed property of a dual-component developer, the non-magnetic cylinder may be subjected to surface roughening by blast processing or the like.

A plurality of poles (N-pole and S-pole) of the magnetic field generating device (magnet roller) are disposed in the non-magnetic cylinder so that the magnetic field generating device is immovable in the non-magnetic cylinder. The magnetic field generating device may be a magnet or the like capable of generating a magnetic field at all times. The magnetic field generating device may also be an electromagnet or the like capable of arbitrarily generating a magnetic field with different polarities.

In the present embodiment, repulsive poles (S1, S3) with the same polarity are provided so as to remove a developer from the developing sleeve after development. A regulating member (regulating blade) for regulating the thickness of a developer taken up to the developing sleeve is disposed so as to be substantially opposed to the repulsive pole S3 downstream in a rotation direction of the developing sleeve. The developing sleeve is also designed to feed a developer to a developing portion from a lower side to an upper side in a gravity direction. Because of such a configuration, a developer taken up to the developing sleeve can be prevented from being excessively compressed (being supplied with an excess load). Therefore, the characteristics of a developer (in particular, carriers) can be prevented from being changed over a long period of time.

In the present embodiment, a peak position of a magnetic force Fr is disposed in the vicinity of the closest portion (developing portion), downstream in a rotation direction of the non-magnetic cylinder from the closest portion. Herein, the magnetic force Fr is a component in a vertical (normal) direction to the surface of the non-magnetic cylinder among a magnetic force F (vector) generated by the magnetic field generating device at an arbitrary position on the surface of the non-magnetic cylinder. More specifically, it is assumed that a component in a tangential direction among the intensity of a magnetic field (magnetic flux density) B (vector) generated by the magnetic field generating device at an arbitrary position on the surface of the non-magnetic cylinder is $B\Theta$. Then, a peak position of a slope with respect to the direction vertical to the surface of the non-magnetic cylinder, of the sum of the square of the absolute value of Br and the square of the absolute value of $B\Theta$, is disposed in the vicinity of the closest portion (developing portion), downstream in a rotation direction of the non-magnetic cylinder from the closest portion.

Furthermore, a peak position of Br is also disposed in the vicinity of the closest portion (developing portion), downstream in a rotation direction of the non-magnetic cylinder from the closest portion.

Hereinafter, the reason for the above will be described.

The slope with respect to the direction vertical to the surface of the non-magnetic cylinder, of the sum of the square of the absolute value of Br and the square of the absolute value of $B\Theta$, represents a force (magnetic attractive force) for attracting magnetic carriers bearing toner to the non-magnetic cylinder by the magnetic field generating device fixed in the non-magnetic cylinder.

The magnetic force Fr (unit: N (newton)) acting in a vertical direction to the surface of the non-magnetic cylinder with respect to one magnetic carrier is represented by the following formula:

$$Fr = -A\nabla r(m \cdot B)$$
$$= -Ad/dr(|m|VB \cdot B)$$
$$= -|m|VAd/dr(B^2)$$
$$= -|m|VAd/dr\{(Br)^2 + (B\theta)^2\}$$

where m is magnetization of the magnetic carrier (vector, the unit of $|m|$ is A/m), V is a volume ($m^3$) of one magnetic carrier, B (B=(Br, $B\Theta$)) is an intensity of a magnetic field generated by a magnet roller, and a direction toward the rotation center of the non-magnetic cylinder (developing sleeve) is a positive (plus) direction. Herein, since A is a constant, $|m|$ is a function of a magnetic permeability, and r is set in a radiation direction (normal direction) to the surface of the developing sleeve, the direction of a force corresponds to that toward the center of the sleeve.

Thus, the force Fr acting in a vertical direction to the surface of the developing sleeve is proportional to the slope (the direction toward the center of the sleeve is assumed to be positive) with respect to the direction vertical to the surface of the developing sleeve, of the sum of the square of the absolute value of Br and the square of the absolute value of $B\Theta$.

Figure 5:
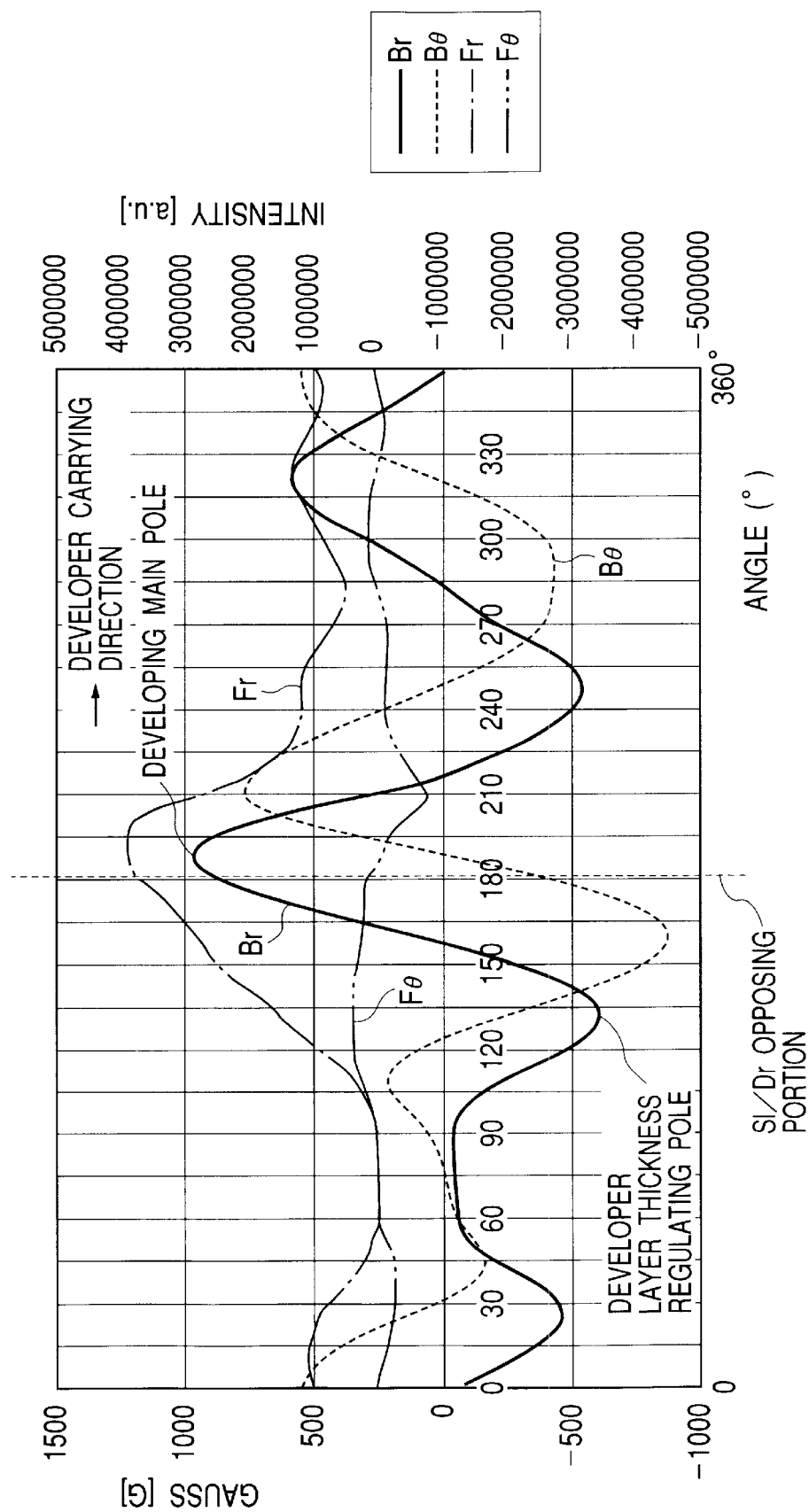
FIG. 5 is a graph showing an intensity distribution of BΘ, Br, FΘ, and Fr with respect to a developing sleeve peripheral direction.
Figure 6:
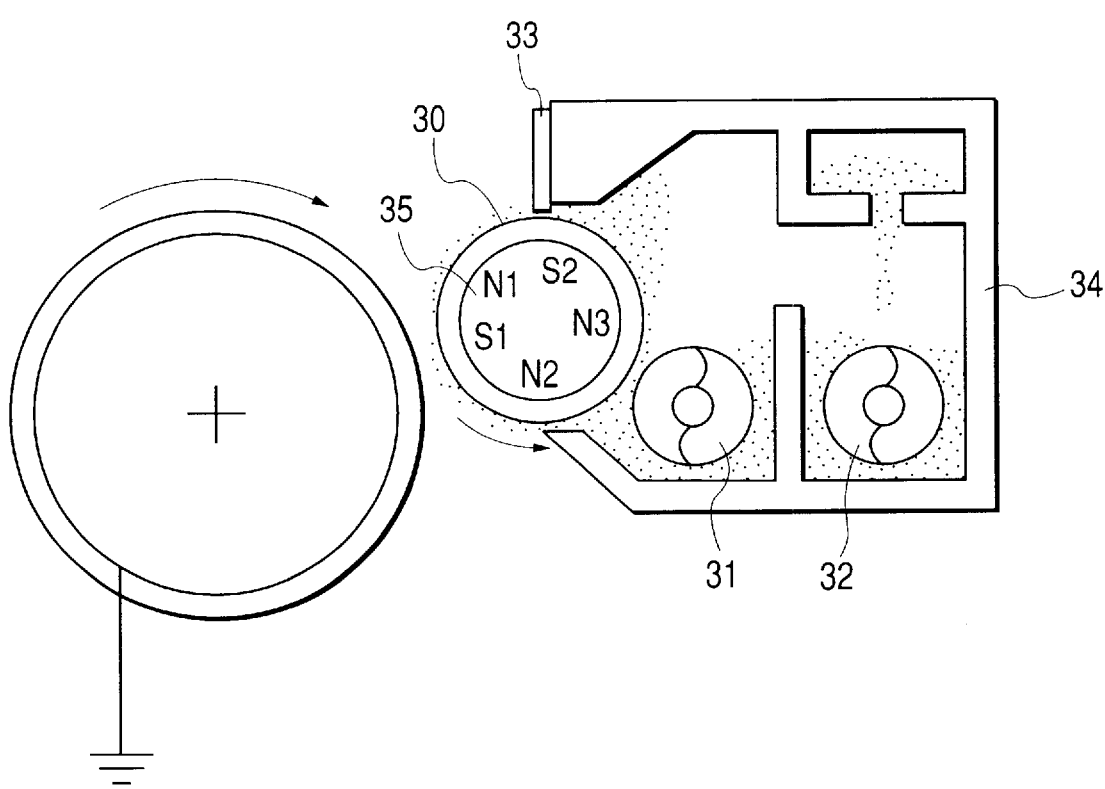
FIG. 6 is a schematic view showing an example of a conventional developing device.

FIG. 5 shows an example of an intensity distribution of Br, $B\Theta$, Fr, and $F\Theta$ in a peripheral direction of the developing sleeve. The vertical axis on the left side represents Gauss (G), and the vertical direction on the right side represents an intensity (a.u.). The horizontal axis represents a position, i.e., an angle in the peripheral direction of the developing sleeve (the rotation direction of the developing sleeve is directed from the left side to the right side in FIG. 5). An "Sl/Dr opposing portion" refers to the closest portion between the developing sleeve and the photoconductor. As is understood from FIG. 5, the peak position of Fr is disposed slightly downstream of the closest portion (Sl/Dr opposing portion), and at this position, $F\Theta$ is shifted from a plus side to a minus side. This means that, on the plus side, $F\Theta$ exerts a force for directing a developer to the peak of Fr.

As described above, the peak position of the slope with respect to the direction vertical to the surface of the non-magnetic cylinder, of the sum of the square of the absolute value of Br and the square of the absolute value of $B\Theta$, is disposed in the vicinity of the developing portion (closest portion), downstream in a rotation direction of the non-magnetic cylinder from the developing portion. Therefore, even when conductive magnetic powder enters the developing container as described above, the conductive magnetic powder fed to the developing portion by the non-magnetic cylinder is attracted to the peak position of Fr disposed downstream in a rotation direction of the non-magnetic cylinder from the developing portion.

Furthermore, it is understood from FIG. 5 that, upstream of the developing portion, a developer is supplied with a force for directing the developer to the peak position of Fr by FΘ (force acting on the carriers (magnetic member) in a tangential direction of the surface of the developing sleeve). More specifically, it is understood that conductive magnetic powder is prevented from accumulating upstream.

Thus, the conductive magnetic powder on the non-magnetic cylinder passes through the developing portion (closest portion) without accumulating upstream (inlet side of the developing portion) in a rotation direction of the non-magnetic cylinder from the developing portion, whereby discharge marks as described can be prevented from being generated. If discharge marks should occur, continuous generation thereof, an occurrence frequency thereof, and an occurrence scale thereof can be suppressed.

It is preferable that the peak position of Fr is set between the closest portion (developing portion) and the position downstream by 15° in a rotation direction of the non-magnetic cylinder from the closest portion.

If the Fr peak position is disposed further downstream from a position downstream by 15° in a rotation direction of the non-magnetic cylinder, the action of a force on conductive magnetic powder becomes small, and the effect of preventing conductive magnetic powder from accumulating becomes insufficient. In the embodiment described below, the diameter of the developing sleeve is 16 mm. Therefore, the distance in the peripheral direction of the developing sleeve between the closest portion and the position downstream by 15° in a rotation direction of the non-magnetic cylinder from the closest portion becomes about 2.1 mm.

The closest portion in the present embodiment refers to a position where the surface of the non-magnetic cylinder and the surface of the image bearing member are opposed to each other at the smallest distance.

Figure 3:
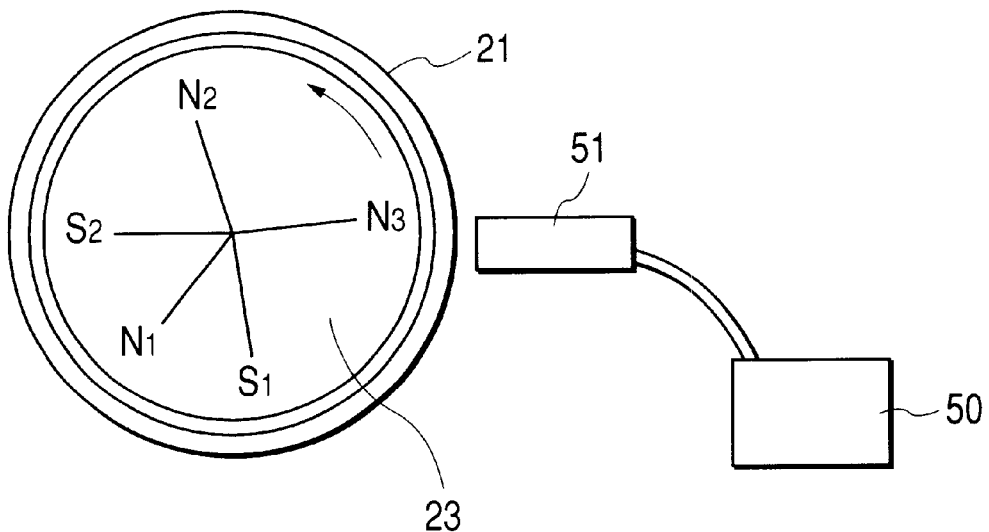
FIG. 3 illustrates a method for measuring Br.
Figure 4:
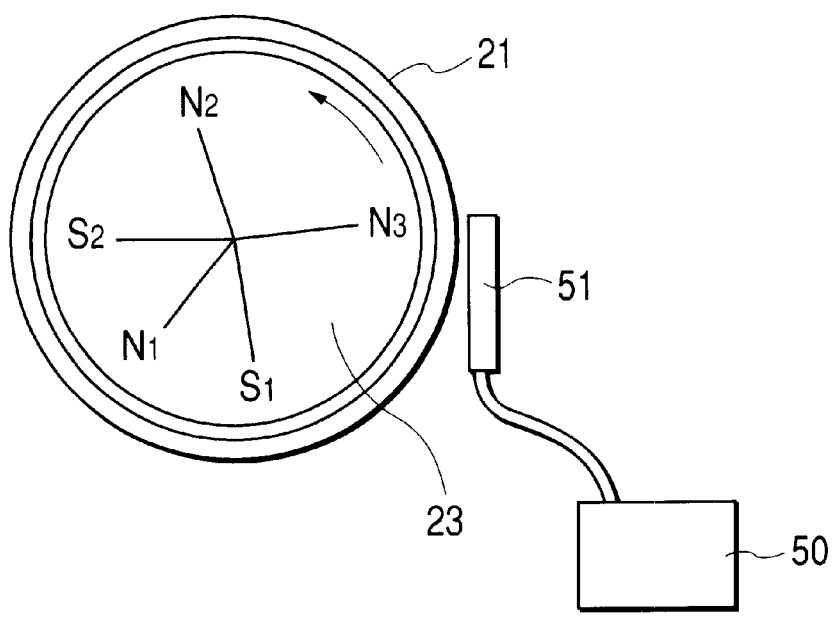
FIG. 4 illustrates a method for measuring BΘ.

Furthermore, the intensity of a magnetic field Br, BΘ can be measured by the methods shown in FIGS. 3 and 4.

FIG. 3 illustrates a method for measuring a magnetic flux density Br in the normal direction at an arbitrary position on the surface of a developing sleeve (non-magnetic cylinder) 21. In this method, a magnetic flux density Br is measured by using Gauss meter Model 640 manufactured by Bell Corporation. In FIG. 3, the developing sleeve 21 is fixed horizontally, and a magnet (magnetic field generating device) 23 in the developing sleeve 21 is rotatably attached to the developing sleeve 21. An axial probe 51 is horizontally fixed at a slight distance (in this measurement, about 100 μm) from the developing sleeve 21 in such a manner that the center of the developing sleeve 21 and the center of the probe 51 are positioned on substantially the same horizontal surface. The axial probe 51 is also connected to a gauss meter 50 so as to measure a magnetic flux density on the surface of the developing sleeve 21. The developing sleeve 21 and the magnet 23 are disposed substantially concentrically, and the interval between the developing sleeve 21 and the magnet 23 may be considered constant. Thus, by rotating the magnet 23, a magnetic flux density Br in the normal direction at a position on the developing sleeve 21 can be measured in the entire peripheral direction.

FIG. 4 illustrates a method for measuring a magnetic flux density BΘ in a tangential direction on the surface of the developing sleeve 21. In the same way as in FIG. 3, the developing sleeve 21 is fixed horizontally, and the magnet 23 is rotatably attached to the developing sleeve 21. An axial probe 51 is fixed at a slight distance (similarly, about 100 μm) from the developing sleeve 21 in such a manner that the center of the developing sleeve 21 and the measurement center of the probe 51 are substantially horizontal. The axial probe 51 is also connected to a gauss meter 50 so as to measure a magnetic flux density in a tangential direction on the surface of the developing sleeve 21. In the same way as described in FIG. 3, by rotating the magnet 23 in an arrow direction, the magnetic flux density BΘ in a tangential direction on the surface of the developing sleeve 21 can also be measured in the entire peripheral direction.

As the above-mentioned developing container, any developing container preferably used for containing a dual-component developer may be used. Conventionally known various configurations can be used. In the developing container, it is preferable that at least two containing spaces are formed with a partition wall formed therebetween. The first space is used for directly supplying a developer to the non-magnetic cylinder, and the second space is used for supplying a new developer to the first space. It is also preferable that each space is appropriately provided with agitating and feeding units for agitating and feeding a developer contained therein. It is also preferable that the second space is provided with a supply member for supplying new non-magnetic toner if required.

In the above, the developing device used in an image forming apparatus has been described. However, the present invention is not limited thereto. The developing device may be formed into a unit so as to be used as a cartridge detachably mountable to the image forming apparatus. In addition to the developing device, the cartridge may integrally include at least one of various devices constituting an image forming portion, such as a photoconductor, a cleaner, and a primary charger.

There is no particular limit to the above-mentioned non-magnetic toner. Known toner can be used as long as it is used for a dual-component developer. The non-magnetic toner can be formed by using, in appropriate amounts, binder resin such as styrene resin and polyester resin, a colorant such as carbon black, a dye, and a pigment, a release agent such as wax, a charge control agent, and the like. Such non-magnetic toner can be produced by an ordinary method such as a pulverizing method or a polymerizing method.

It is preferable that the non-magnetic toner (negative chargeability) has a triboelectrification amount of $-1 \times 10^{-2}$ to $-4.5 \times 10^{-2}$ C/kg. When the triboelectrification amount of the non-magnetic toner is outside of this range, a development efficiency is decreased, which may cause an image defect. The triboelectrification amount of the non-magnetic toner may be adjusted by selecting the kind and the like of material to be used or by adding an extraneous additive described later.

The triboelectrification amount of the non-magnetic toner can be measured by air-attracting toner from a developer (amount thereof being about 0.5 to 1.5 g) by a general blow-off method, and measuring a charge amount inducted to a measurement container.

The non-magnetic toner preferably has a volume mean particle diameter of 4 to 15 μm. Herein, as the volume mean particle diameter of the non-magnetic toner, for example, a numerical value measured by the following measurement method is used.

As the measurement apparatus, COULTER COUNTER TA-II (manufactured by COULTER K.K.) is used. The apparatus is connected to an interface (manufactured by Nikkaki K.K.) for outputting an individual number mean distribution and a volume mean distribution and CX-i personal computer (manufacture by Canon Inc.). As an electrolyte, 1% NaCl aqueous solution is adjusted with primary sodium chloride.

For measurement, 0.1 to 5 mL of a surfactant (preferably, alkyl benzene sulfonate) is added as a dispersant to 100 to 150 mL of the electrolyte aqueous solution, and 0.5 to 50 mg of a measurement sample is further added thereto.

The electrolyte in which the sample is suspended is subjected to dispersion treatment in an ultrasonic dispersion device for about 1 to 3 minutes. A size distribution of particles of 2 to 40 $\mu$m is measured using an aperture of 100 $\mu$m by COULTER COUNTER TA-II to obtain a volume distribution. A volume mean particle diameter of the sample can be obtained from the volume distribution thus obtained.

As the magnetic carriers, those which are conventionally known can be used. Examples of the magnetic carriers include resin carriers obtained by dispersing magnetite in resin as a magnetic material, and dispersing carbon black in the resultant resin for the purpose of providing conductivity and adjusting resistance, carriers obtained by subjecting the surface of single magnetite such as ferrite to oxidation and reduction to adjust resistance, and carriers obtained by coating the surface of signal magnetite such as ferrite with resin to adjust resistance. There is no particular limit to a method for producing these magnetic carriers.

It is preferable that the magnetic carriers have a magnetization of $3.0 \times 10^4$ A/m to $2.0 \times 10^5$ A/m in a magnetic field of 0.1 tesla. When the magnetization of the magnetic carriers is smaller than this range, adhesion of the magnetic carriers to the non-magnetic cylinder by the magnetic field generating device becomes difficult, which may cause an image defect such as light image density. When the magnetization of the magnetic carriers is larger than the range, compression of a developer is increased while the developer is being fed by the non-magnetic cylinder, which may cause degradation of the developer due to compression.

Furthermore, it is preferable that the volume resistivity of the magnetic carriers is $10^7$ to $10^{14}$ $\Omega$cm, considering leakage and a developing property.

The magnetization of the carriers is measured by using an oscillating magnetic field-type magnetic property autorecording apparatus BHV-30 (manufactured by Riken Denshi K.K.). The magnetic property value of the carrier powder is measured by forming an outer magnetic field of 0.1 T and obtaining the intensity of the magnetization at that time. The carriers are tightly packed in a cylindrical plastic container. In this state, a magnetization moment is measured, an actual weight when a sample is placed is measured, and the intensity of magnetization is obtained ($Am^2/kg$). Then, the absolute specific gravity of the carrier particles is obtained by a dry type automatic density meter Accupyc 1330 (manufactured by Shimadzu Corporation), and the intensity ($Am^2/kg$) of magnetization is multiplied by the absolute specific gravity, whereby the intensity (A/m) of magnetization per unit volume used in the present invention is obtained.

Furthermore, the magnetic carriers have a weight average diameter preferably in a range of 20 to 100 $\mu$m, more preferably in a range of 20 to 70 $\mu$m. When the weight average diameter of the magnetic carriers is smaller than the above-mentioned range, a feed property of the non-magnetic toner may be insufficient. When the weight average diameter of the magnetic carriers is larger than the above-mentioned range, the flowability, chargeability, a feed property, and the like of a dual-component developer may be adversely affected.

The weight average diameter of the magnetic carriers may be measured in the same way as in or in accordance with the above-mentioned measurement of a particle size of non-magnetic toner. Alternatively, the weight average diameter may be measured by a screening method. More specifically, sieves with different openings are stacked in a decreasing order of the size of an opening. A sample whose weight is previously measured is placed in the first sieve for screening. The residual amount in each sieve is measured, and represented by an accumulation percentage with respect to the total amount.

The dual-component developer may contain another preferably used material, in addition to the above-mentioned non-magnetic toner and magnetic carriers. An example of such a material includes an extraneous additive for controlling the flowability, chargeability, and the like of a developer.

The extraneous additive has an effect on the non-magnetic toner. Furthermore, by covering the surface of the non-magnetic toner, the extraneous additive has another effect. More specifically, the flowability of the toner is enhanced, and consequently, supply toner becomes likely to be mixed and agitated with a dual-component developer in the developing container. When the extraneous additive is present on the surface of toner, a release property of the non-magnetic toner with respect to the photosensitive drum is enhanced, and a transfer efficiency becomes satisfactory.

It is preferable that the extraneous additive used in the present invention has a particle size of $\frac{1}{10}$ or less of the weight average diameter of the non-magnetic toner particles, in terms of durability when added to the non-magnetic toner. The particle size of the extraneous additive refers to an average particle size obtained by observing the surface of the toner particles by an electron microscope.

As the extraneous additive, various kinds of inorganic and organic compounds conventionally known as an extraneous additive can be used. Examples of them include a metal oxide (aluminum oxide, titanium oxide, strontium titanate, cerium oxide, magnesium oxide, chromium oxide, tin oxide, zinc oxide, etc.), a nitride (silicon nitride, etc.), a carbide (silicon carbide, etc.), a metal salt (potassium sulfate, barium sulfate, calcium carbonate, etc.), a fatty acid metal salt (zinc stearate, calcium stearate, etc.), carbon black, silica, and the like.

The extraneous additive is used in an amount of 0.01 to 10 parts by weight, preferably 0.05 to 5 parts by weight based on 100 parts by weight of the non-magnetic toner particles. The extraneous additive may be used alone or in combination. It is also preferable that the extraneous additive is rendered hydrophobic.

Embodiments

Hereinafter, the present invention will be described by way of an illustrative example with reference to the drawings.

FIG. 1 shows a color printer of an electrophotographic process to which the present invention is applicable.

The printer shown in FIG. 1 includes an electrophotographic photosensitive drum (image bearing member) 3 that rotates in the direction of the arrow. Around the photosensitive drum 3, image forming means is disposed, which includes a charger 4 as a charging member for uniformly charging the surface of the photosensitive drum 3 to be negative, a rotary developing apparatus 1 provided with developing devices 1M, 1C, 1Y, and 1Bk, a transfer charger 10, a cleaning unit 12, a laser beam scanner LS provided above the photosensitive drum 3 in the figure and irradiating a laser beam L corresponding to an image density signal of an original, and the like.

Furthermore, an abrasive member for refreshing a wire of a charger used for a corona charging system, degraded due to repeated use, is provided at an end portion (outside of a charged region) of the wire in a longitudinal direction so as to be slidable with respect to the wire.

Each developing device includes a dual-component developer containing negatively charged toner particles and carrier particles. The developer in the developing device 1M contains magenta toner. The developer in the developing device 1C contains cyan toner. The developer in the developing device 1Y contains yellow toner. The developer in the developing unit 1Bk contains black toner.

An original to be copied is read by an original reading apparatus (not shown). The reading apparatus has a photoelectric converter, such as a CCD, for converting an image of an original into an electric signal, and outputs an image signal corresponding to magenta image information, cyan image information, yellow image information, and monochromic image information of an original. A semiconductor laser built in the scanner LS is controlled in accordance with these image signals and emits a laser beam L.

An image can also be formed based on an image density signal from an electronic computer (e.g., a computer connected via a network cable).

The entire sequence of the image forming portion will be briefly described by exemplifying the case of a full color mode for forming a full color image. A monochromic mode for forming a monochromic image such as a black and white image, and a mode for forming a two-color or three-color image can also be selected by a control apparatus (CPU).

The photosensitive drum 3 is charged uniformly by the charger 4. Then, the photosensitive drum 3 is scanned with the laser beam L modulated by a magenta image density signal and exposed to light, whereby a dot distribution latent image is formed on the photosensitive drum 3. This latent image is subjected to reverse development by the magenta developing device 1M previously moved to a developing position.

A transfer material such as paper, which is taken out of a cassette C and proceeds via a feed guide 5a, a feed roller 6, and a feed guide 5b is held by a gripper 7 of a transfer drum 9. Then, the transfer material is electrostatically wound around the transfer drum 9 by an abutting roller 8 and its counter pole. The transfer drum 9 rotates in the direction of the arrow in synchronization with the photosensitive drum 3. A magenta visualized image developed in the magenta developing device 1M is transferred to the transfer material by the transfer charger 10 at a transfer portion. The transfer drum 9 continues to rotate, and is ready for transfer of an image of a subsequent color (cyan in FIG. 1).

On the other hand, the charger 11 eliminates the residual charges of the photosensitive drum 3, and the photosensitive drum 3 is cleaned by the cleaning unit 12, charged again by the charger 4, and exposed to the laser beam L modulated with a subsequent cyan image signal as described above, whereby an electrostatic latent image is formed. During this period, the rotary developing apparatus 1 rotates, and the cyan developing device 1C is placed at a predetermined developing position. Then, reversal development of a dot distribution electrostatic latent image corresponding to cyan is conducted to form a cyan visualized image.

The above-mentioned process is conducted with respect to a yellow image signal and a black image signal. When transfer of visualized images (toner images) of four colors is completed, the transfer material is dielectrified by charge eliminators 13 and 14. The gripper 7 is released, and the transfer material is separated from the transfer drum 9 by a separation claw 15. Then, the transfer material is sent to a fixing device (heat pressure roller fixing device) 17 by a transfer belt 16. The fixing device 17 fixes visualized images of four colors overlapped on the transfer material. Thus, a full color print sequence is completed, and a desired full color print image is formed.

The present embodiment is described merely for illustrative purpose. For example, the charger 3 may be a charging roller, instead of a corona charger, and the transfer charger 7 may be a transfer roller. Thus, various systems can be adopted. Basically, as described above, an image is formed by the steps of charging, light-exposure, development, transfer, and fixing.

Next, one of four developing devices, the developing device 1M, will be described with reference to the drawings. The developing devices other than the developing device 1M have a similar configuration to that of the developing device 1M. Therefore, the description thereof will be omitted.

Figure 2:
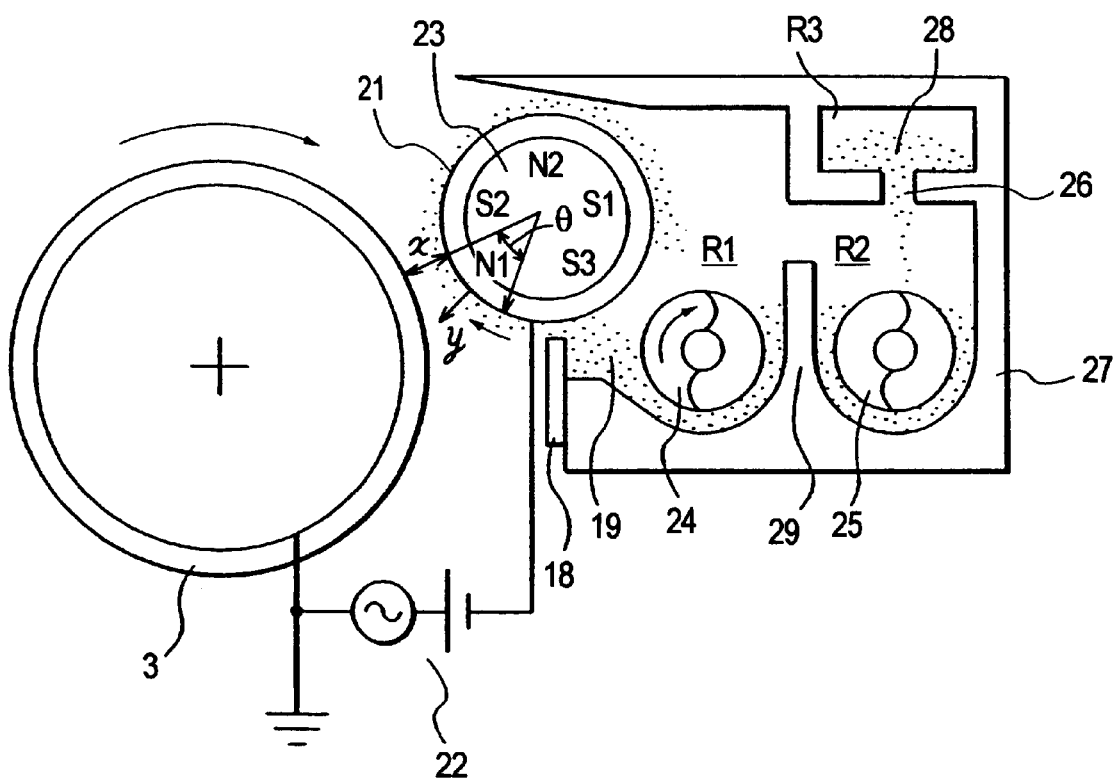
FIG. 2 is a schematic view of a developing device of an example according to the present invention.

FIG. 2 is a view showing a configuration of the developing device 1M used in the embodiment of the present invention. As shown in FIG. 2, the developing device 1M has a developing container 27. The developing container 27 is partitioned into a developing chamber (first chamber) R1 and an agitating chamber (second chamber) R2 by a partition wall 29. A toner storage chamber R3 is formed above the agitating chamber R2 via the partition wall 29. The toner storage chamber R3 contains supply toner (non-magnetic toner) 28. The partition wall 29 is provided with a supply port 26, and the supply toner 28 in an amount corresponding to that of consumed toner is dropped to be supplied to the agitating chamber R2 via the supply port 26.

The developing chamber R1 and the agitating chamber R2 contain a developer 19. The developer 19 is produced by pulverization. The developer 19 is a dual-component developer composed of non-magnetic toner (hereinafter, merely referred to as "toner") with a triboelectrification amount of about $-2.0 \times 10^{-2}$ C/kg and an average particle size of 8 μm, titanium oxide with an average particle size of 20 nm added to the toner in an amount of 1% by weight, and magnetic carriers with a magnetization value of $2.7 \times 10^5$ A/m at 0.1 tesla and an average particle size of 35 μm (the mixed ratio of the magnetic carriers is prescribed so that the ratio of the non-magnetic toner becomes about 7% by weight).

An opening is provided at a portion of the developing container 27 close to the photosensitive drum 3. A developing sleeve (non-magnetic cylinder) 21 as a developer carrying member protrudes outside through the opening. The developing sleeve 21 is rotatably incorporated into the developing container 27. In the present embodiment, the developing sleeve 21 is made of a non-magnetic material such as SUS305AC, and a magnet roller (magnet) 23 as a magnetic field generating device is fixed in the developing sleeve 21.

The magnet 23 includes a development pole N1, a developer layer thickness regulating pole S3 positioned downstream of the development pole N1, poles N2 and S2 for carrying the developer 19, and a releasing pole S1. The magnet 23 is disposed in the developing sleeve 21 so that the development pole N1 is opposed to the photosensitive drum 3. The development pole N1 forms a magnetic field in the vicinity of the developing portion between the developing sleeve 21 and the photosensitive drum 3, and a magnetic brush is formed on the developing sleeve 21 by the magnetic field. At this position, the developer fed in the direction of the arrow in synchronization with the rotation of the developing sleeve 21 comes into contact with the photosensitive drum 3, whereby an electrostatic latent image on the photosensitive drum 3 is developed.

At this time, the developing sleeve 21 and the photosensitive drum 3 move in opposite directions (counter directions) at a closest portion x (developing portion) between the developing sleeve 21 and the photosensitive drum 3. The developer used for development at the pole N1 is stripped from the developing sleeve 21 by a repulsive magnetic field formed by the poles S1 and S3 and drops to the developing chamber R1. The development pole N1 is disposed downstream by 10° in a rotation direction of the developing sleeve 21 at the opposing portion between the developing sleeve 21 and the photosensitive drum 3. Furthermore, the pole S3 is disposed so as to be substantially opposed to a regulating blade 18 for regulating a layer thickness of the developer on the developing sleeve 21. The diameter of the developing sleeve 21 is preferably 10 to 50 mm in view of miniaturization of an apparatus. In the present embodiment, the developing sleeve 21 with a diameter of 16 mm is used.

Furthermore, as described above, the intensity of a magnetic field on the surface of the developing sleeve 21 was measured by a gauss meter shown in FIGS. 3 and 4. As a result, assuming that the direction toward the center of the developing sleeve 21 is positive, a peak position y (peak position of Fr) of a slope with respect to the tangential direction of the developing sleeve 21, of the sum of the square of the absolute value of an intensity (Br) of a magnetic field in the normal direction of the developing sleeve 21 and the square of the absolute value of an intensity (Bθ) of a magnetic field in the tangential direction of the developing sleeve 21 was disposed downstream by 10° from the closest position, and a peak position of Br was disposed downstream by 5° from the closest portion (FIG. 5).

In the case of counter development, when the development pole N1 is disposed upstream in a rotation direction of the developing sleeve 21 from the opposing portion between the developing sleeve 21 and the photosensitive drum 3, a developer fed to a development nip (i.e., a length in a peripheral direction of the photosensitive drum 3 at which the magnetic brush on the developing sleeve 21 and the photosensitive drum 21 come into contact with each other) accumulates upstream in a rotation direction of the developing sleeve 21 (downstream in a rotation direction of the photosensitive drum 3), and carriers are likely to adhere to the photosensitive drum 3. Therefore, in the present embodiment, the development pole N1 is disposed between the closest portion of the developing sleeve 21 and the photosensitive drum 3 and the position downstream by θ=15° in a rotation direction of the developing sleeve 21 from the closest portion X. If the development pole N1 is disposed further downstream from 15° position of the development sleeve 21, a developer does not come into contact with the photosensitive drum 3, and edge enhancement such as sweeping-together is likely to be conspicuous.

The developing sleeve is supplied with a vibration bias voltage in which a D.C. voltage is superimposed on an A.C. voltage by a power supply 22. A dark section potential (potential in a portion not exposed to light) and a bright section potential (potential in a portion exposed to light) of a latent image are between the maximum value and the minimum value of the vibration bias potential. Thus, an alternating electric field whose direction is varied alternately is formed in the developing portion. In this alternating electric field, toner and carriers vibrate vigorously. Then, toner is released from an electrostatic binding force of the developing sleeve 21 and carriers, and toner adheres to the photosensitive drum 3 in an amount corresponding to the potential of a latent image. In the present embodiment, the dark section potential of the photosensitive drum 3 is prescribed to be −550 volts, and the bright section potential is prescribed to be −100 volts. The developing sleeve 21 is supplied with −300 volts as a D.C. bias, and a development bias of Vpp 2.0 kV, Frq. 6 kHz as an A.C. bias.

A blade 18 is disposed below the developing sleeve 21 at a predetermined distance from the developing sleeve 21. The interval between the developing sleeve 21 and the blade 18 is 400 μm. The blade 18 is fixed at the developing container 27. The blade 18 is made of a magnetic material such as iron, and magnetically regulates the layer thickness of the developer 19 on the developing sleeve 21.

A feeding screw 24 is accommodated in the developing chamber R1. The feeding screw 24 has a blade with a diameter of 14 mm. The feeding screw 24 is rotated in an arrow direction shown in the figure. Due to the rotation of the feeding screw 24, the developer 19 in the developing chamber R1 is fed to an entire region of the developing sleeve 21 in a longitudinal direction thereof. In the present embodiment, the feeding screw 24 is disposed below the developing sleeve 21 in the gravity direction. This is because the uppermost surface of the developer contained in the feeding screw 24 is set between the developer layer thickness regulating pole and the releasing pole.

A feeding screw 25 is accommodated in the storage chamber R2. The feeding screw 25 has a blade with a diameter of 14 mm as in the feeding screw 24. The feeding screw 25 feeds toner in an entire region in a longitudinal direction of the developing sleeve 21 while agitating it, and passes the thoroughly agitated developer to the developing chamber R1. An appropriate amount of toner drops naturally to the agitating chamber R2 from the supply port 26.

Next, the positional relationship among the developer layer thickness regulating pole of the developing device used in the present embodiment, the releasing pole for forming a repulsive magnetic field together with the developer layer thickness regulating pole, and a screw in the vicinity of the developing sleeve will be described together with their functions.

In the present embodiment, among the poles S3 and S1 for forming a repulsive magnetic field, the pole S3 is used as a developer layer thickness regulating pole, and the pole S1 is used as a developer releasing pole. It is preferable that a peak value of an intensity Br of a magnetic field of the pole S3 in a direction vertical to the surface of the developing sleeve is in a range of 0.04 to 0.1 tesla, and a peak value of an intensity Br of a magnetic field of the pole S1 in a direction vertical to the surface of the developing sleeve is in a range of 0.04 to 0.08 tesla. In the present embodiment, a peak value of an intensity of a magnetic field of the pole S3 was prescribed to be 0.06 tesla, and a peak value of an intensity of a magnetic field of the pole S1 was prescribed to be 0.05 tesla.

Furthermore, the poles S3 and S1 have a positional relationship such that a peak position of an intensity of a magnetic field in a direction vertical to the surface of the developing sleeve of the releasing pole S1 is positioned above, in the gravity direction, a peak position of an intensity of a magnetic field in a direction vertical to the surface of the developing sleeve of the developer layer thickness regulating pole S3.

Because of such a configuration, a developer after development is likely to drop even without a particular releasing member, and the developer is adsorbed by a magnetic attractive force by the developer layer thickness regulating pole, which allows the developer to be fed to the developing portion easily. More specifically, release of the developer from the developing sleeve, and supply of the developer to the developing sleeve can be conducted with a simple configuration.

Furthermore, the peak position of an intensity of a magnetic field of the pole S3 in a direction vertical to the surface of the developing sleeve and the end (developing sleeve side) of the regulating blade are offset by 5° (i.e., an angle formed by a line connecting the center position of the developing sleeve to the end of the regulating blade and a line connecting the center position of the developing sleeve to the peak position of the pole S3).

Since the poles S3 and S1 form a repulsive magnetic field, the magnetic lines of force of the pole S3 is likely to diffuse vertically to the developing sleeve. As a result, a change ratio of a magnetic field (magnetic flux density) in a direction vertical to the developing sleeve becomes small.

This corresponds to that a force attracting a developer to the developing sleeve becomes small. With such a configuration, the force of compressing a developer at the developer layer thickness regulating pole is weakened, and degradation of toner and degradation of a developer such as spent carriers are suppressed, which prolongs a life of a developer. However, this effect is not obtained only by the configuration in which one of the poles forming a repulsive magnetic field is used as the developer layer thickness regulating pole.

As a result of various studies, the following is found regarding the above-mentioned discharge marks formed by conductive magnetic powder (having a volume resistivity of $10^3$ Ωcm or less). More specifically, the generation of discharge marks in a line shape and long discharge marks are caused by accumulation of conductive magnetic powder upstream in a rotation direction of the developing sleeve at the closest portion between the developing sleeve and the photosensitive drum. This accumulation is likely to occur in the case where the magnetization of magnetic carriers is small and a feeding force of a dual-component developer is weak.

In the configuration of the present embodiment, i.e., in the case where the magnetization of magnetic carriers is made relatively small, and the developing sleeve and the photosensitive drum are allowed to move in opposite directions at the closest portion, the frequency at which discharge marks are generated continuously in a line shape is decreased, and the maximum length of the line-shaped discharge marks becomes small by the following arrangement: A peak position of a slope (the direction toward the center of the developing sleeve is assumed to be positive) with respect to a direction vertical to the surface of the developing sleeve in the vicinity of the development pole N1, of the sum of the square of the absolute value of an intensity (Br) of a magnetic field in a vertical direction of the surface of the developing sleeve and the square of the absolute value of an intensity (BΘ) of a magnetic field in a tangential direction of the developing sleeve is disposed downstream, particularly by 0° to 15° (greater than 0° and 15° or less), in a rotation direction of the developing sleeve from the closest portion between the developing sleeve and the photosensitive drum.

In the configuration of the present embodiment, 50 mg of conductive magnetic powder with a diameter of 100 μm or less and a volume resistivity of $10^3$ Ωcm was forcedly mixed in the developing container, and 1000 sheets of paper was tested for durability. It was found that 150 line-shaped discharge marks were formed in 250 (from 750 to 1000) sheets of paper, and the maximum length of the discharge marks was 50 mm.

As described above, a peak position of a magnetic force Fr vertically acting on the surface of the developing sleeve, that is, a peak position (of a force acting on a developer) of a slope (the direction toward the center of a sleeve is assumed to be positive) in a direction vertical to the surface of the developing sleeve, of the sum of the square of the absolute value of Br and the square of the absolute value of BΘ is disposed at a position within 15° downstream in a rotation direction of the developing sleeve from the closest portion between the developing sleeve and the photoconductor. Therefore, conductive magnetic powder fed along the developing sleeve is attracted to the peak position, whereby the conductive magnetic powder passes through the closest portion without accumulating upstream in a rotation direction of the developing sleeve.

As a result, the frequency at which discharge marks are generated continuously in a line shape is decreased, and the maximum length of the line-shaped discharge marks becomes small. When the force Fr acting on the developer is disposed further downstream from a 15° position, the conductive magnetic powder is less influenced by the force Fr, resulting in a decreased effect on accumulation of the powder.

Comparative Embodiment

In the comparative embodiment, a peak position of a magnetic force Fr vertically acting on the surface of the developing sleeve, that is, a peak position (acting on a developer) of a slope (the direction toward the center of a sleeve is assumed to be positive) with respect to a direction vertical to the surface of the developing sleeve, of the sum of the square of the absolute value of Br and the square of the absolute value of BΘ, was disposed upstream by 3° in a rotation direction of the developing sleeve from the opposing portion between the developing sleeve and the photoconductor. In this configuration, 50 mg of conductive magnetic power with a diameter of 100 μm or less was forcedly mixed in a developing container, and 1000 sheets of paper was tested for durability. As a result, it was found that 1500 line-shaped discharge marks were formed in 250 (from 750 to 1000) sheets of paper, and the maximum length of the discharge marks was 140 mm.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A developing device comprising:

a developing container for containing a developer including non-magnetic toner and magnetic carriers;

a developer carrying member for bearing and carrying the developer contained in said developing container; and a magnetic field generating device for generating a magnetic field and being provided in said developer carrying member, wherein an electrostatic latent image, which is formed on an image bearing member, is developed with a magnetic brush, which is formed on said developer carrying member by said magnetic field generating device, wherein the image bearing member and said developer carrying member move in opposite directions at a closest portion therebetween, and wherein a peak position of a magnetic force Fr of the magnetic field in a direction vertical to a surface of said developer carrying member is disposed in a vicinity of the closest portion and downstream in a rotation direction of said developer carrying member from the closest portion.

2. A developing device according to claim 1, wherein the peak position of the magnetic force Fr is disposed between the closest portion and a position away from the closest portion by 15° downstream in the rotation direction of said developer carrying member.

3. A developing device according to claim 1, wherein assuming that $B\theta$ represents an intensity of the magnetic field in a tangential direction of the surface of said developer carrying member, and Br represents an intensity of the magnetic field in the direction vertical to the surface of said developer carrying member, the magnetic force Fr is represented by the following equation:

$$Fr = A \cdot \nabla r \{(Br)^2 + (B\theta)^2\},$$

wherein A is a constant, and where the peak position of the magnetic force is disposed in the vicinity of the closest portion and downstream in the rotation direction of said developer carrying member from the closest portion.

4. A developing device according to claim 3, wherein the peak position of $A \cdot \nabla r \{(Br)^2 + (B\theta)^2\}$ is disposed between the closest portion and a position away from the closest portion by 15° downstream in the rotation direction of said developer carrying member.

5. A developing device according to claim 4, further comprising a regulating member for regulating a layer thickness of the developer borne on said developer carrying member, wherein said magnetic field generating device includes a first magnetic pole for releasing the developer from said developer carrying member and a second magnetic pole provided downstream in the rotation direction of said developer carrying member from said first magnetic pole, wherein said first and second magnetic poles have the same polarity, and wherein said regulating member is substantially opposed to said second magnetic pole.

6. A developing device according to claim 5, wherein a magnetization of the magnetic carriers is $3.0 \times 10^4$ to $2.0 \times 10^5$ (A/m) in the magnetic field of 0.1 tesla.

7. A developing device according to any one of claims 1 to 6, wherein a peak position of an intensity Br of the magnetic field in the direction, which is vertical to the surface of said developer carrying member, is disposed in the vicinity of the closest portion and downstream in the rotation direction of said developer carrying member from the closest portion.

8. A developing device according to claim 7, wherein the peak position of the intensity Br is disposed between the closest portion and a position away from the closest portion by 15° in the rotation direction of said developer carrying member.

9. A developing device according to claim 1, wherein said developer carrying member is a non-magnetic cylinder.

10. A developing device according to claim 1, wherein said developer carrying member is supplied with a voltage in which a D.C. voltage is superimposed on an A.C. voltage during development.

11. A developing device according to claim 1, wherein said magnetic brush is in contact with the image bearing member during development.

12. A cartridge detachably mountable to an image forming apparatus, said cartridge comprising:

a developing container for containing a developer including non-magnetic toner and magnetic carriers;

a developer carrying member for bearing and carrying the developer contained in said developing container; and a magnetic field generating device for generating a magnetic field and provided in said developer carrying member, wherein an electrostatic latent image formed on an image bearing member is developed with a magnetic brush formed on said developer carrying member by said magnetic field generating device, wherein the image bearing member and said developer carrying member move in opposite directions at a closest portion therebetween, and wherein a peak position of a magnetic force Fr of the magnetic field in a direction vertical to a surface of said developer carrying member is disposed in a vicinity of the closest portion and downstream in a rotation direction of said developer carrying member from the closest portion.

13. A cartridge according to claim 12, wherein the peak position of the magnetic force Fr is disposed between the closest portion and a position away from the closest portion by 15° downstream in the rotation direction of said developer carrying member.

14. A cartridge according to claim 12, wherein assuming that $B\theta$ represents an intensity of the magnetic field in a tangential direction of the surface of said developer carrying member, and Br represents an intensity of the magnetic field in the direction vertical to the surface of the developer carrying member, the magnetic force Fr is represented by the following equation:

$$Fr = A \cdot \nabla r \{(Br)^2 + (B\theta)^2\},$$

wherein A is a constant, and wherein a peak position of the magnetic force Fr is disposed in the vicinity of the closest portion and downstream in the rotation direction of said developer carrying member from the closest portion.

15. A cartridge according to claim 14, wherein the peak position of $A \cdot \nabla r \{(Br)^2 + (B\theta)^2\}$ is disposed between the closest portion and a position away from the closest portion by 15° downstream in the rotation direction of said developer carrying member.

16. A cartridge according to claim 15, further comprising a regulating member for regulating a layer thickness of the developer on said developer carrying member, wherein said magnetic field generating device includes a first magnetic pole for releasing the developer from said developer carrying member and a second magnetic pole provided downstream in the rotation direction of said developer carrying member from said first magnetic pole, wherein said first and second magnetic poles have the same polarity, and wherein said regulating member is substantially opposed to said second magnetic pole.

17. A cartridge according to claim 16, wherein a magnetization of the magnetic carriers is $3.0 \times 10^4$ to $2.0 \times 10^5$ (A/m) in the magnetic field of 0.1 tesla.

18. A cartridge according to any one of claims 12 to 17, wherein a peak position of an intensity Br of the magnetic field in the direction, which is vertical to the surface of said developer carrying member, is disposed in the vicinity of the closest portion and downstream in the rotation direction of said developer carrying member from the closest portion.

19. A cartridge according to claim 18, wherein the peak position of the intensity Br is disposed between the closest portion and a position away from the closest portion by 15° in the rotation direction of said developer carrying member.

20. A cartridge according to claim 12, wherein said developer carrying member is a non-magnetic cylinder.

21. A cartridge according to claim 12, wherein said developer carrying member is supplied with a voltage in which a D.C. voltage is superimposed on an A.C. voltage during development.

22. A cartridge according to claim 12, wherein said magnetic brush is in contact with the image bearing member during development.

23. A cartridge according to claim 12, further comprising the image bearing member.

* * * * *

UNITED STATES PATENT AND TRADEMARK OFFICE
CERTIFICATE OF CORRECTION

PATENT NO. : 6,539,192 B2
DATED : March 25, 2003
INVENTOR(S) : Masaru Hibino

Page 1 of 1

It is certified that error appears in the above-identified patent and that said Letters Patent is hereby corrected as shown below:

Column 10,
Line 59, "is" should read -- are --.

Column 15,
Line 14, "is" should read -- are --.
Line 18, "to that" should read -- to --.
Line 19, "sleeve" should read -- sleeve that --.
Line 62, "was" should read -- were --.

Column 17,
Line 20, "force" should read -- force Fr --.

Signed and Sealed this

Twenty-fifth Day of November, 2003

JAMES E. ROGAN
*Director of the United States Patent and Trademark Office*